3,395,109
GOLF BALL COVER COMPOSITION COMPRISING A BLEND OF POLYESTERURETHANE ELASTOMERS
Robert P. Molitor and Vaughn E. Valentine, South Hadley, Mass., assignors to A. G. Spalding & Bros. Inc., Chicopee, Mass., a corporation of Delaware
No Drawing. Filed Oct. 8, 1962, Ser. No. 229,212
5 Claims. (Cl. 260—22)

The present invention relates to golf ball cover compositions and especially to compositions comprising a blend of a low modulus polyester polyurethane with a higher modulus polyester polyurethane, nylon or the like.

It is an object of the invention to provide a composition suitable for golf ball covers which has the requisite physical properties, such as click, resistance to cutting, resistance to change in performance due to temperature changes and has high tensile strength.

It is a further object of the invention to provide a cover stock which produces a good feel or control of the ball as it leaves the club head.

It is a still further object of the invention to provide a composition which is particularly useful in injection molding of covers on the ball.

Other objects will be apparent from the description which follows.

We have discovered that a blend of a low modulus polyester polyurethane with a higher modulus polyester polyurethane and suitable conventional molding aids, pigments, plasticizers and internal lubricants and fillers produces a golf ball composition which is highly successful, particularly in injection molding of golf ball covers on golf ball centers.

The polyester polyurethanes suitable for use according to the present invention are well known in the polyurethane field. Suitable materials are commercially available under the trademarks Texin 192A and 355D. These resins are described in Mobay Chemical Company publication "Processing of Urethane Elastomers Using Thermoplastic-Type Techniques" by Pigott et al. which teaches that such elastomers are produced by reacting a polyester, diisocyanate and chain extender according to the procedures outlined in United States Patent No. 2,729,618. Texin 192A has a low modulus at 300% elongation equal to from 2000 to 2800 pounds/sq. in. and Texin 355D has a high modulus at 300% elongation equal to from 3000 to 3700 pounds/sq. in.

The molding and/or processing aids may be an acrylonitrile-butadiene-styrene resin such as a polymeric material resulting from the interaction under polymerizing conditions of a conjugated diolefin polymer latex or a conjugated diolefin-vinyl aromatic copolymer latex with a mixture of a vinyl cyanide and a vinyl aromatic. Such polymeric materials are marketed under the trademark Cycolac, including Cycolac H2502.

Other molding and/or processing aids are polyvinyl chloride and polyvinyl chloride-acetate such as those commercially available under the trademark Geon including suitable plasticizers and heat stabilizers. One such suitable material is Geon 101EP which is a straight thermoplastic polyvinyl chloride resin. Barium stearate can be the internal lubricant and/or filler. Titanium dioxide can be the pigment where white cover stock is desired. Where polyvinyl chloride or polyvinyl chloride-acetate are used, suitable plasticizers as dioctyl phthalate and dioctyl adipate may be used as well as a heat stabilizer lead phosphate.

The resulting cover for the ball is tough, durable, has good rebound, driving distance, cutting resistance, click and has a particular advantage in that it does not change in performance due to wide temperature changes as may be encountered in playing a ball in winter and summer. Also, the cover stock has a good feel or control of the ball as it leaves the striking face of the head during the playing of the ball.

Specific examples of our invention are as follows:

Example I

| | Parts by wt. |
|---|---|
| Texin 355D | 60 |
| Texin 192A | 40 |
| Cycolac H2502 | 30 |
| Titanium dioxide | 8 |
| Barium stearate | 1 |

While the above represents the preferred proportions, we have successfully used Texin 355D in amounts between 50–70 parts and Texin 192A in amounts between 50–30 parts.

The ingredients are then blended in a mill and the covers molded in the manner noted above.

Example II

| | Parts by wt. |
|---|---|
| Texin 355D | 60 |
| Texin 192A | 40 |
| Cycolac H2502 | 30 |
| Estane 5740x2 | 10 |
| Titanium dioxide | 8 |
| Barium stearate | 1 |

While the above represents the preferred proportions, we have successfully used Texin 355D in amounts between 50–70 parts and Texin 192A in amounts between 50–30 parts. Estane 5740x2 is a low modulus polyester polyurethane having a modulus at 300% elongation equal to 420 pounds/sq. in. and is described in Service Bulletin G–18, Revised July, 1960 by B. F. Goodrich Company.

The ingredients are then blended in a mill and the covers molded in the manner noted above.

Thus, it will be seen that by combining a low modulus polyester polyurethane elastomer with a higher modulus resin, preferably a higher modulus polyester polyurethane, a highly satisfactory golf ball cover can be obtained which has all the requisites and physical properties of a golf ball cover, with such additional properties of producing a good feel or control of the ball as it leaves the club head; and by adding molding aids to the composition, a highly satisfactory injection molding composition can be attained.

Variations and modifications may be made within the scope of the claims and portions of the improvements may be used without others.

We claim:
1. A golf ball cover stock comprising a blend of:
   (a) 100 parts by weight of a mixture of at least 50 parts by weight of a first linear thermoplastic polyesterurethane elastomer having a high modulus which at 300% elongation is equal to at least 3000 p.s.i. and a minor amount by weight equaling at least 15 parts by weight of a second linear thermoplastic polyesterurethane elastomer having a substantially lower modulus than said first elastomer and which at 300% elongation is equal to at most 2800 p.s.i., and
   (b) up to about 40 parts by weight of a molding aid composition comprising a major amount by weight of a resinous material selected from the group consisting of polyvinyl chloride, vinyl chloride-vinyl acetate copolymers and acrylonitrile-butadiene-styrene resins, and a minor amount by weight of a pigment.
2. A golf ball cover stock comprising a blend of:
   (a) 100 parts by weight of a mixture of from 50 to 70 parts by weight of a first linear thermoplastic polyesterurethane elastomer having a high modulus which at 300% elongation is equal to at least 3000 p.s.i. and from 50 to 30 parts by weight of a second linear thermoplastic polyesterurethane elastomer having a substantially lower modulus than said first elastomer and which at 300% elongation is equal to at most 2800 p.s.i., and
(b) up to about 40 parts by weight of a molding aid composition comprising a major amount by weight of an acrylonitrile-butadiene-styrene resin, and minor amounts by weight of a pigment and an internal lubricant.

3. A golf ball cover stock according to claim 2 in which the molding aid composition comprises up to 30 parts by weight of the acrylonitrile-butadiene-styrene resin, up to 8 parts by weight of titanium dioxide as pigment and up to 2 parts by weight of barium stearate as internal lubricant.

4. A golf ball cover stock comprising a blend of:
(a) 100 parts by weight of a mixture of from 65 to 85 parts by weight of a first linear thermoplastic polyesterurethane elastomer having a high modulus which at 300% elongation is equal to at least 3000 p.s.i. and from 35 to 15 parts by weight of a second linear thermoplastic polyesterurethane elastomer having a substantially lower modulus than said first elastomer and which at 300% elongation is equal to at most 2800 p.s.i., and
(b) up to about 40 parts by weight of a molding aid composition comprising a major amount by weight of a vinyl chloride polymer, and minor amounts by weight of a pigment and an internal lubricant.

5. A golf ball cover stock according to claim 4 in which the molding aid comprises up to 30 parts by weight of the vinyl chloride polymer, up to 9 parts by weight of titanium dioxide as pigment and up to about 1.2 parts by weight of barium stearate as internal lubricant.

References Cited
UNITED STATES PATENTS

| | | | |
|---|---|---|---|
| 2,606,162 | 8/1952 | Coffey et al. | 260—859 |
| 2,729,618 | 1/1956 | Muller et al. | 260—858 |
| 2,871,218 | 1/1959 | Schollenberger | 260—858 |
| 3,144,352 | 8/1964 | Talley | 260—859 |
| 2,888,433 | 5/1959 | Parker | 260—45.4 |
| 3,012,987 | 12/1961 | Ansul | 260—45.4 |
| 3,049,505 | 8/1962 | Grabowski | 260—45.4 |
| 3,106,539 | 10/1963 | Hendricks et al. | 260—23 |

FOREIGN PATENTS

| | | |
|---|---|---|
| 220,155 | 2/1959 | Australia. |
| 770,051 | 3/1957 | Great Britain. |
| 770,289 | 3/1957 | Great Britain. |
| 754,732 | 8/1956 | Great Britain. |
| 149,056 | 11/1952 | Australia. |
| 632,221 | 12/1961 | Canada. |

OTHER REFERENCES

Australia abstract No. 26,995/57 Apr. 11, 1957, 1 page, 260—858.

DONALD E. CZAJA, *Primary Examiner.*

R. W. GRIFFIN, *Assistant Examiner.*